United States Patent [19]

Sikula, Jr.

[11] 4,177,529
[45] Dec. 11, 1979

[54] FILTER WRENCH
[75] Inventor: William J. Sikula, Jr., Waterloo, Iowa
[73] Assignee: Deere & Company, Moline, Ill.
[21] Appl. No.: 934,901
[22] Filed: Aug. 18, 1978
[51] Int. Cl.² ............................................. B25F 1/00
[52] U.S. Cl. ..................................... 7/100; 7/138; 81/3.1 R; 141/330
[58] Field of Search ........................... 7/100, 138, 158; 81/1 R, 2, 3 R, 3.1 R, 53 R, 90 B, 90 C, 121 R; 141/330; 222/80, 145

[56] References Cited
U.S. PATENT DOCUMENTS

| | | | |
|---|---|---|---|
| 1,657,782 | 1/1928 | Berg | 81/3.1 R X |
| 2,746,330 | 5/1956 | Pfetzing | 81/53 R |
| 3,043,171 | 7/1962 | Lederer | 81/90 C |
| 3,635,106 | 1/1972 | Homs | 81/121 R |
| 3,677,513 | 7/1972 | Truelove | 81/121 R X |
| 3,785,225 | 1/1974 | McKenna et al. | 81/3.1 R |
| 3,855,882 | 12/1974 | Wittmann | 81/121 R |
| 4,022,258 | 5/1977 | Steidley | 141/330 |

Primary Examiner—James G. Smith

[57] ABSTRACT

A filter wrench includes a cylindrical housing with internal lugs and a centrally positioned punch for draining and removing a screw-on filter having an outer canister and an inner filter element. As the housing is impactively positioned over the filter, the punch successively punctures the outer canister and then the inner filter element before the lugs indent the outer canister and the bottom of the housing abuts the canister. With the punch extending through the punctures, the housing is held on the filter while the outer canister and the inner filter element are drained through passages in the punch and an outlet in the housing. When draining is complete, a formed nut on the outside of the housing allows the filter wrench to be rotated causing the lugs to rotate the filter for removal.

14 Claims, 2 Drawing Figures

FILTER WRENCH

BACKGROUND OF THE INVENTION

The present invention relates generally to oil filter wrenches and more particularly to a self-draining oil filter wrench.

In the remote past, many simple wrenches were devised for removing engine oil filters, but in the immediate past, there has been a general halt to progress in this art with only minor improvements being developed.

Conventional canister type oil filters are generally screwed on to the bottom of internal combustion engines where they are difficult and messy to remove. The mechanic must reach up and remove the filter with a single purpose wrench which allows oil, which may often be quite hot, to splash over the outside of the filter and adjacent structures, and on to the mechanic. In addition, where the filter is positioned at the lowest point in a lubrication system, the removal of the filter not only exposes oil that is in the filter itself but further causes drain of all the oil in the system out through the filter to engine connection.

There has been a long-felt need for a wrench which would be both convenient to use while providing clean draining of the oil both in the filter cartridge as well as in the lubrication system.

SUMMARY OF THE INVENTION

The present invention provides a self-draining oil filter wrench which is both convenient and clean to use.

By providing a housing with an interiorly upstanding punch with clearance drains, it is possible for the filter wrench to be impactively forced over the filter while punching drain holes into the filter so as to allow drain of the filter and of the system through an outlet in the bottom of the housing. Lugs in the bottom of the housing which indent the filter simultaneously with the impactive positioning allow a wrench to be attached to the housing to rotate it for unscrewing the filter from the engine.

Thus the filter can be emptied while in place and then removed when all the oil has been drained from the filter and the system.

The above and additional advantages of the present invention will become apparent to those skilled in the art from a reading of the following detailed description when taken in conjunction with the accompanying drawings.

DESCRIPTION OF THE PREFERRED EMBODIMENT

Figure 1:
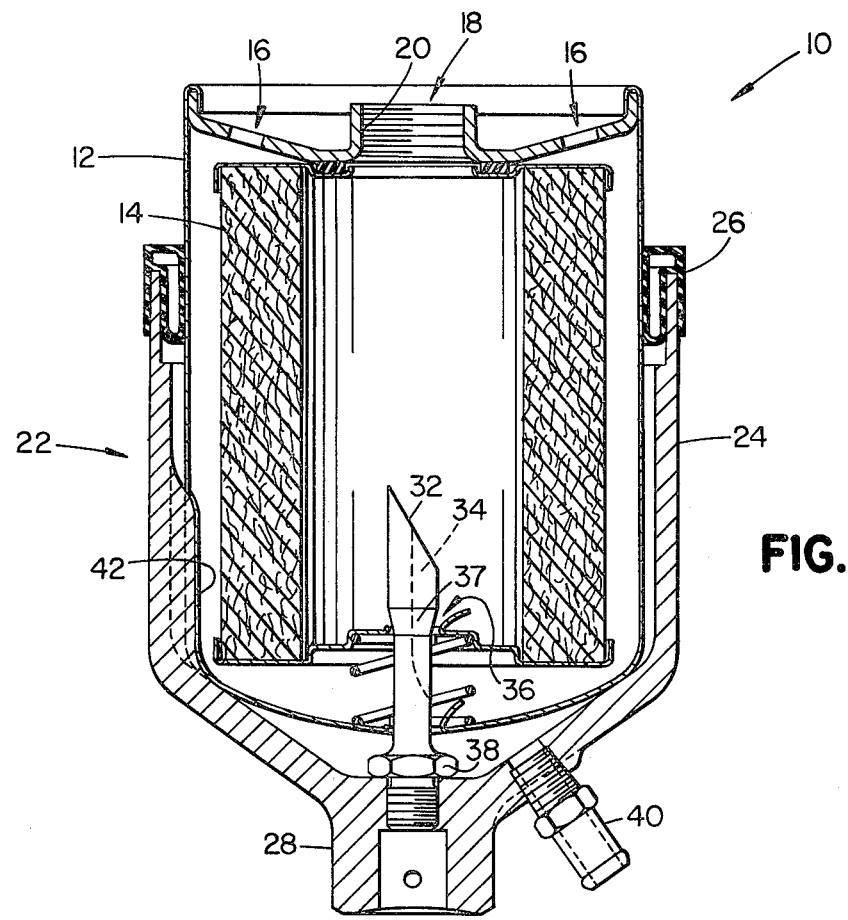
FIG. 1 is a cross-sectional view taken along the line 1—1 of FIG. 2 showing a conventional filter with the present invention in its operative position.

Referring now to FIG. 1, therein is shown a conventional filter 10 having an outer canister 12 and an inner filter element 14. The space between the canister 12 and the filter element 14 is connected to filter inlet ports 16. The space within the filter element 14 is connected to a filter outlet 18 which is provided with threads 20 which are intended to engage mating threads on an internal combustion engine (not shown).

Figure 2:
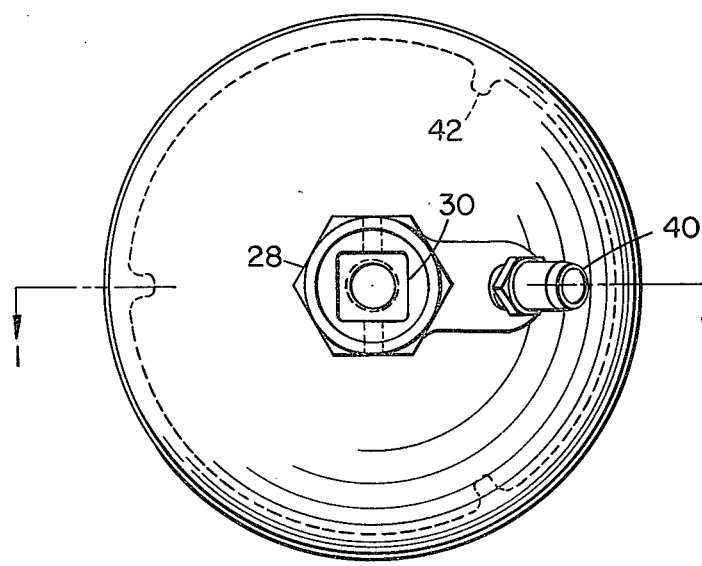
FIG. 2 is a bottom view of the present invention.

The filter 10 is encircled by a filter wrench 22 which includes a wrench housing 24 which is open at the top end where it is encircled by a rubber bulb type seal 26. At the bottom closed end of the wrench housing 24 the housing is configured to form a nut 28 and a drive socket 30 which may best be seen in FIG. 2.

A cutting punch 32 is screwed into the bottom of the wrench housing 24 coaxially with the drive socket 30. The cutting punch 32 is provided with an inner passage 34 and a reduced portion which defines an outer passage 36. The cutting punch 32 also has a hex portion 38 integral therewith to allow removal of the cutting punch 32 as well as tightening the cutting punch 32 into the wrench 2ousing 34.

A drain nipple 40 is provided in the bottom of the wrench housing 24 for draining fluid from inside the wrench housing 24 to a convenient container (not shown) for disposal of oil drained from the filter 10.

Equally spaced around the periphery of the bottom of the wrench housing 24 are three lugs 42 which are shown indenting the filter canister 12.

In operation, a standard drive socket wrench handle and extension is inserted into the drive socket 30 to provide the necessary length and leverage to reach and remove the filter 10. Initially, the wrench housing 24 is lifted into place around the filter 10. The rubber bulb-type seal 26 slides up around the filter canister 12 so as to center the wrench housing 24 therearound and seal the space between the canister 12 and the wrench housing 24.

The end of the extension is then struck from underneath by a hammer to force the filter wrench 22 over the filter 10. The cutting punch 32 is ground at an angle to make a partial circular cut in the canister 12 and to roll the circular piece back as the punch 32 is driven through.

Before the canister 12 is completely punctured, the punch begins to puncture through the end of the filter element 14 so as to provide constant resistance through the positioning process.

With further penetration of the cutting punch 32, the lugs 42 indent and grip the canister 12 so as to prevent relative rotation between the wrench housing 24 and the canister 12.

When the cutting punch 32 completes its cut both through the canister 12 and the inner filter element 14, the mechanic feels a distinct change of resistance as the large diameter of the cutting punch 32 breaks through and the wrench housing 24 bottoms against the canister 12.

When the mechanic releases the wrench housing 24, the rubber bulb type seal 26 and the taper 37 on the cutting punch 32 resting on the edge of the hole in the filter element will prevent the filter wrench 22 from falling off of the filter 10. In this position, oil from the inside of the filter element 14 will drain through the inner passage 34 into the canister 12. Because of the reduced portion of the cutting punch 32 which defines the outer passage 36, oil will pass through the outer passage 36 through the canister 12 into the wrench housing 24. Oil in the wrench housing 24 will then drain through the drain nipple 40 into the disposal container.

While the rubber bulb type seal 26 is provided to prevent any oil from escaping from between the canister 12 and the wrench housing 24, the flow areas of the inner and outer passages 34 and 36 are sized so that the sum of the two flow areas is equal to or less than than flow area of the drain nipple 40 so that the wrench housing 24 will be drained faster than it can be filled from the filter 10.

Once the oil has been completely drained, the socket wrench handle can be turned to cause the lugs 42 to rotate the filter canister 12 so as to unscrew it from the engine.

Removal from the filter 10 from the wrench housing 24 is clean and convenient because there will be no oil on that portion of the canister 12 above the rubber bulb type seal 26.

It will be noted that the cutting punch 32 can easily be removed from the wrench housing 24 for sharpening to always maintain the desired cutting edge for easy operation.

While the invention has been described in conjunction with a specific embodiment, it is to be understood that may alternatives, modifications, and variations will be apparent to those skilled in the art in light of the aforegoing description. Accordingly, it is intended to embrace all such alternatives, modifications, and variations which fall within the spirit and scope of the appended claims.

I claimed:

1. A filter wrench for draining and removing a fluid filter having an outer canister and an inner filter element from a filter utilizing device, comprising: a housing having a closed bottom and an open top sized to encircle and engage said fluid filter, said housing having gripping means provided on the inside thereof for gripping portions of said outer canister when said housing engages said fluid filter, and said housing having rotating means provided thereon for rotating said housing for removal of said fluid filter; punch means secured to said housing extending from the bottom thereof for puncturing said outer canister when said housing engages said fluid filter, said punch means having outer passage means provided therein for allowing the passage of fluid from said outer canister into said housing; and outlet means provided in said housing at the bottom thereof for allowing the drain of fluid therefrom.

2. The filter wrench as claimed in claim 1 wherein said punch means has a predetermined length to begin puncture of said inner filter element before puncture of said outer canister is complete when said housing is brought into engagement with said filter.

3. The filter wrench as claimed in claim 2 wherein said punch means includes retaining means for holding said housing around said fluid filter after said inner filter element is punctured.

4. The filter wrench as claimed in claim 3 wherein said punch means has inner passage means provided therein for allowing the passage of fluid from said inner filter element into said outer canister after said inner filter element has been punctured by said punch means.

5. The filter wrench as claimed in claim 4 including seal means disposed around the open top of said housing for preventing the flow of fluid between said outer canister and said housing to the outside of said housing.

6. The filter wrench as claimed in claim 5 wherein said inner and outer passage means and said outlet means have first, second, and third flow areas, respectively, and the sum of the first and second flow areas is approximately equal to said third flow area.

7. The filter wrench as claimed in claim 6 wherein said punch means is removable from said housing.

8. A filter wrench for draining and removing an oil filter having an outer canister and an inner filter element from an internal combustion engine, comprising: a cylindrical housing having a closed bottom and an open top sized to encircle and engage said oil filter, said housing having lug means provided on the inside thereof for indenting portions of said outer canister when said housing engages said oil filter, and said housing having rotating means provided thereon for rotating said housing for removal of said oil filter; punch means secured to said housing extending from the bottom thereof for puncturing said outer canister when said housing engages said oil filter, said punch means having a reduced portion provided therein for allowing the passage of oil from said outer canister into said housing; and outlet means provided in said housing at the bottom thereof for allowing the drain of oil therefrom.

9. The filter wrench as claimed in claim 8 wherein said punch means has a predetermined length to begin puncture of said inner filter element before puncture of said outer canister is complete as the bottom of said housing is brought into engagement with said outer canister.

10. The filter wrench as claimed in claim 9 wherein said punch means includes taper means for holding said housing around said inner filter element.

11. The filter wrench as claimed in claim 10 wherein said punch means has inner passage means provided therein for allowing the passage of oil from said inner filter element into said outer canister after said inner filter element has been punctured by said punch means and said taper means holds said housing around said inner filter element.

12. The filter wrench as claimed in claim 11 including seal means secured around the open top of said housing for preventing the leakage of oil between said outer canister and housing to the outside of said housing.

13. The filter wrench as claimed claim 12 wherein said inner passage means, reduced portion, and said outlet means have first, second, and third flow areas, respectively, and the sum of the first and second flow areas is equal to or less than the third flow area.

14. The filter wrench as claimed in claim 13 wherein said punch means is removable from said housing.

* * * * *